US009784176B2

(12) United States Patent
Carter

(10) Patent No.: US 9,784,176 B2
(45) Date of Patent: Oct. 10, 2017

(54) ENGINE WARMING SYSTEM

(71) Applicant: Dan Carter, Twin Falls, ID (US)

(72) Inventor: Dan Carter, Twin Falls, ID (US)

(73) Assignee: Coldfire, Inc., Twin Falls, ID (US)

( * ) Notice: Subject to any disclaimer, the term of this patent is extended or adjusted under 35 U.S.C. 154(b) by 0 days.

(21) Appl. No.: 15/285,954

(22) Filed: Oct. 5, 2016

(65) Prior Publication Data

US 2017/0022956 A1 Jan. 26, 2017

Related U.S. Application Data

(63) Continuation of application No. 14/529,439, filed on Oct. 31, 2014, now Pat. No. 9,611,782.

(60) Provisional application No. 61/926,689, filed on Jan. 13, 2014.

(51) Int. Cl.

| | |
|---|---|
| ***B60H 1/03*** | (2006.01) |
| ***F01P 11/04*** | (2006.01) |
| ***F02N 19/10*** | (2010.01) |
| ***F01P 11/20*** | (2006.01) |
| ***F01P 3/20*** | (2006.01) |
| *F02N 19/02* | (2010.01) |
| *F02B 3/06* | (2006.01) |

(52) U.S. Cl.

CPC ................ *F01P 11/04* (2013.01); *F01P 3/20* (2013.01); *F01P 11/20* (2013.01); *F02N 19/10* (2013.01); *F01P 2037/02* (2013.01); *F01P 2060/18* (2013.01); *F02B 3/06* (2013.01); *F02N 19/02* (2013.01)

(58) Field of Classification Search

CPC .. F02N 19/10; F02N 19/02; F02B 3/06; F01P 11/20; F01P 2060/18

USPC .................................................. 123/142.5 R

See application file for complete search history.

(56) References Cited

U.S. PATENT DOCUMENTS 5,911,243 A * 6/1999 Cohen ................ F16K 11/0525 137/625.43
2005/0235984 A1* 10/2005 Trihey ................ F24D 17/0068 126/615
2007/0113476 A1* 5/2007 Thomas .................. B01B 1/005 48/198.7
2012/0291738 A1* 11/2012 Hobart .................... F02N 19/10 123/142.5 R

* cited by examiner

*Primary Examiner* — Jacob Amick
*Assistant Examiner* — Charles Brauch
(74) *Attorney, Agent, or Firm* — Robert L. Shaver; Shaver & Swanson, LLP

(57) ABSTRACT

A system for warming the engine of a water-cooled vehicle by exchanging coolant with a warm vehicle or a storage tank of warmed coolant. The system utilizes a fitting that, in one position, allows for normal function of the cooling system of a vehicle, and in another position the fitting allows for fluid exchange with an outside source, such as another vehicle. The outside source can be a second vehicle equipped with a fitting or a standalone heater. Fluid transfer hoses are connected to each fitting to exchange coolant between vehicles.

6 Claims, 4 Drawing Sheets

ENGINE WARMING SYSTEM

PRIORITY/CROSS-REFERENCE TO RELATED APPLICATIONS

This application is a continuation of U.S. Nonprovisional application Ser. No. 14/529,439 filed Oct. 31, 2014 and claims the benefit of U.S. Provisional Application No. 61/926,689, filed Jan. 13, 2014, the disclosure of which is incorporated by reference.

TECHNICAL FIELD

The presently disclosed and claimed technology generally relates to an apparatus for warming a cold vehicle, and more particularly to a fitting for exchanging fluid between a warm vehicle and a cold vehicle.

BACKGROUND

Liquid cooled engines become problematic in cold climates. The cold weather can cause the oil and coolant to become more viscous. The more viscous fluids can provide less lubrication as well as making it more difficult for the engine to start. In this cold weather the batteries are also much less effective. In extreme climates this can even result in the inability of the vehicle to start.

Systems have been developed that utilize electricity to heat the vehicle fluids or the entire engine to make starting them in cold weather easier. One solution is just to keep the engine running at all times. This is not cost effective, especially for a fleet of vehicles. Electric engine heating systems require installation of the system on the vehicle and then connecting the system to an electrical source, such as a regular a/c outlet at a home or shop. These systems are typically unworkable in some operations where the vehicles are kept in remote locations. This can happen in a number of situations including farming, ranching, construction and other operations where more than one vehicle is being used. In the situations where the vehicles are in remote locations, the electrical heating solution is not available due to the distance from the nearest outlet.

SUMMARY OF THE DISCLOSURE

The purpose of the Summary of the Invention is to enable the public, and especially the scientists, engineers, and practitioners in the art who are not familiar with patent or legal terms or phraseology, to determine quickly from a cursory inspection, the nature and essence of the technical disclosure of the application. The Summary of the Invention is neither intended to define the invention of the application, which is measured by the claims, nor is it intended to be limiting as to the scope of the invention in any way.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the description of the preferred embodiments are to be regarded as illustrative in nature, and not as restrictive in nature.

Disclosed is an engine warming system for a water cooled vehicle. The system allows for the exchange of warm fluid (coolant) from a warmed vehicle or portable tank of warmed coolant, into a cold vehicle while returning fluid from the cold vehicle to a second vehicle or fluid exchanging vessel. The system is made up of a fluid exchange fitting in one vehicle that has two positions, one for normal circulation of fluid in the vehicle cooling system, and one position for sending the coolant of the first vehicle to a second vehicle or coolant reserve tank, for replacement by warmed coolant from a second vehicle or coolant tank. On one version, identical fluid exchange fittings are in a first and a second vehicle, and the two fittings are connected by fluid transfer hoses. There is a conduit between the left and right half allowing for fluid to flow between the two halves as well as a conduit valve located within the conduit for closing or opening the conduit for the fluid flow. This fitting is installed in at least a first vehicle that will require heating.

The fluid exchange fitting has a first inlet port, a first outlet port, a second inlet port, and a second outlet port. The fluid exchange fitting has either one or three valves to switch between the first position and the second position.

The fluid exchange tank can be of several configurations. One option is to have a second fluid exchange fitting mounted on a second vehicle, where the second vehicle provides the heated fluid from its own cooling system. The second vehicle is started at a location remote from the cold vehicle and driven to the cold vehicle. A second option is to have the fluid exchange tank as a standalone unit allowing for direct connection to the fluid exchange fitting on the cold vehicle. The standalone unit could be placed on a truck bed or ATV and driven to the cold vehicle.

A typical configuration in which one vehicle is equipped with a first fluid exchange fitting and a second vehicle is equipped with a second fluid exchange fitting. The two fluid exchange fittings are connected by a first fluid transfer hose and a second fluid transfer hose. These can connect using quick release fittings, for ease of connection. The first fluid transfer hose is connected to the second outlet port of the fluid exchange fitting at one end, and at the other end is attached to the second inlet port of the second fluid exchange fitting. The second fluid exchange hose in this configuration would be attached from the second outlet port of the second fluid exchange fitting to the second inlet port of the first fluid exchange fitting. In this way, coolant fluid could pass from the first vehicle to the second vehicle, and warm fluid from the second vehicle would pass into the cooling system of the first vehicle.

Each of the cooling systems of the two vehicles could operate as normally configured by moving the valve or valves of each fluid exchange fitting to a first position. In the first position, coolant enters the fluid exchange fitting at the first inlet port, and exits at the second inlet port and continues on through the cooling system of the vehicle. The cooling system of the vehicle would include a heater, a radiator, a water pump and fluid exchange passages in the block of the engine. If both the first and the second vehicle are set so that the fluid exchange fittings are in the first position, both vehicles' cooling system would operate normally. If the two fluid exchange fittings are connected by a first and a second fluid transfer hose, and the valve or valves of the fluid exchange fittings were set to a second position, then coolant would circulate between the two vehicles.

The fluid exchange fittings can take several configurations. One of these configurations utilizes a single valve and has a disc shaped hub which is mounted in a fluid exchange fitting body. The disc shaped hub has three passages, a first, a second and a third passage. The first passage connects the first inlet port with the first outlet port, and supports normal circulation of coolant within the vehicle's cooling system.

By turning the valve, the disc shaped hub is also turned, and a second and a third passage is rotated into the second position so that the first inlet port sends coolant to the second outlet port. Fluid from the second vehicle returns to the fluid exchange fitting through the second inlet port and exits the fluid exchange fitting out the first outlet port, and continues on through the rest of the cooling system of the first vehicle.

Other designs for fluid exchange fitting are foreseeable. One alternative embodiment utilizes a single valve having a first passage, a second passage and a third passage. The valve further provides for a first position and a second position. In the first position the second passage creates a fluid path between the first outlet port and the first inlet port. As in the previously described embodiment, this allows the cooling system of the vehicle to function as originally designed. In the second position the first passage creates a fluid path between the second inlet port and the first outlet port. Additionally, in the second position, the third passage creates a fluid path between the first inlet port and the second outlet port. When placed in the second position with the coolant hose and the first transfer hose and second transfer hose connected as previously described the fluid exchange fitting functions to allow external heated fluid to pass through second inlet port through the first passage through the first outlet port and then through the vehicle heater hose. Vehicle coolant hose then returns the displaced fluid to fluid exchange fitting into first inlet port through third passage and out second outlet port then through second transfer hose and then is returned to fluid exchange tank for reheating. The fluid exchange fittings can be mounted in a heater house, a flexible rubber coolant hose, on in a rigid metal tube which is part of the cooling system of a vehicle.

Fluid exchange tank can be of several designs. One potential design is to have a second fluid exchanging fitting connected to a second vehicle. The second vehicle is driven into proximity of the cold vehicle that is to be heated and then the first transfer hose and second transfer hose are connected prior to changing valves to allow for fluid communication between the vehicles. Another potential design is to have a standalone fluid heater. This system could be located on the bed of a truck, 4 wheeler, cart, or other vehicle and could potentially have the first transfer hose and second transfer hose permanently attached. The standalone unit could be powered by a variety of sources including gasoline, diesel or electrical power provided by a battery or by the transportation vehicle. Further, the transfer hoses 36 & 38 can be connected in different ways such as by a quick disconnect fitting or similar devices. The heater hose can be connected to the first outlet port and first inlet port by thread slip fittings or other fittings that are configured for connecting the fluid exchange fitting 12 and the heater hose 28.

DETAILED DESCRIPTION OF THE PREFERRED EMBODIMENTS

Figure 1:
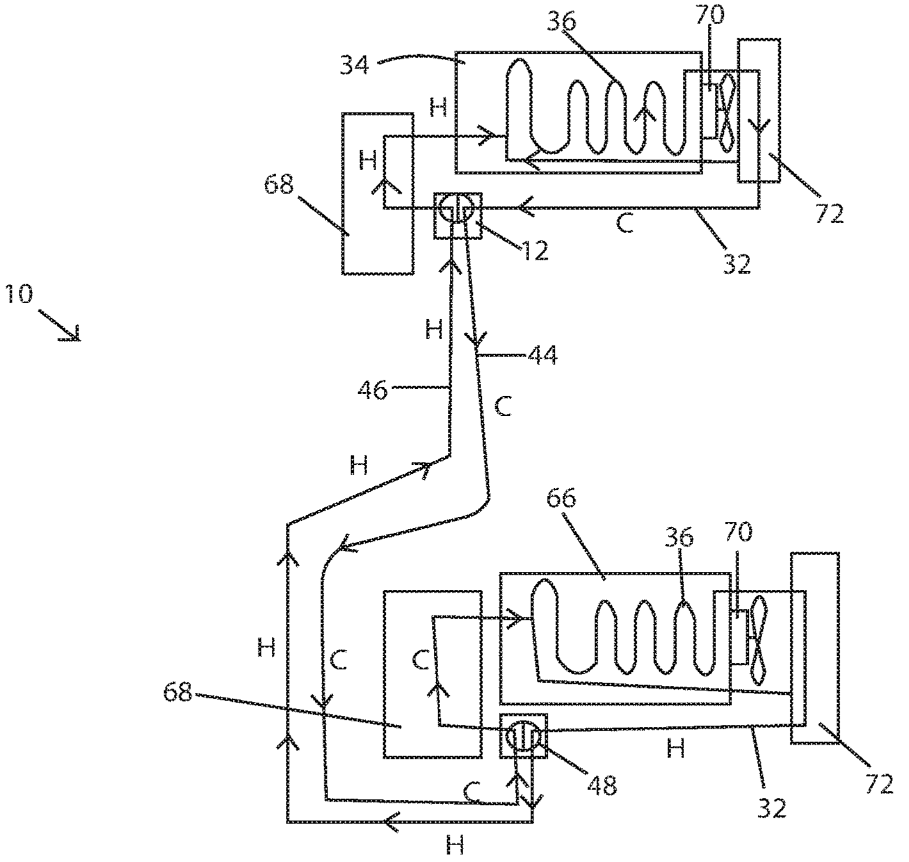
FIG. 1 is a flow diagram depicting the fluid flow through two vehicles in accordance with an embodiment of the inventive concepts.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Certain preferred embodiments of the disclosed technology are shown FIGS. 1 through 7.

Disclosed in FIG. 1 is a diagram of an engine warming system 10 for use on liquid cooled vehicles such as cars, trucks and machinery that is stored in a cold environment. This could include heavy equipment such as earth movers, graders, dump trucks, tracked vehicles, tractors, combines, harvestors, loaders, tractor trailer rigs, as well as boats, snow mobiles, snow vehicles, 4 wheelers, generators, or other equipment using water cooled internal combustion engines.

FIG. 1 shows a first vehicle 34 and a second vehicle 66 connected to each other for coolant exchange. The first vehicle 34 would typically be cold and therefore hard to start, and the second vehicle 66 would be warm and provide warm or hot coolant to first vehicle 34. A typical automobile system is "warmed up" when the coolant is heated to above 212 F in a pressurized system. This "warmed" coolant would be exchanged with a cold vehicle's coolant in the disclosed system. The system 10 could optionally include a loop of heated coolant for heating the battery 68 of the cold vehicle, by use of a coolant filled jacket or box, or by use of one or more tubes which surround the cold battery and transfer heat into the cold battery.

Shown in FIG. 1 is a cooling system 36 in each of the vehicles, which includes a coolant hose 32. Coolant is circulated through the cooling system by a water pump 70, with coolant circulating through a radiator 72 and from there through the coolant hose 32, which could be a heater hose. The coolant hose 32 would return coolant to the cooling system 36, or as shown in FIG. 1 could route coolant adjacent to or surrounding a battery 68, to warm up the battery for more powerful starting. This system includes a first fluid exchange fitting 12 in the first vehicle 34, and a second fluid exchange fitting 48 in the second vehicle 66.

Also shown is a first fluid transfer hose 44 and a second fluid transfer hose 46, which are used to transfer fluid from the warm vehicle 66 to the cold vehicle 34 and vice versa.

Figure 2:
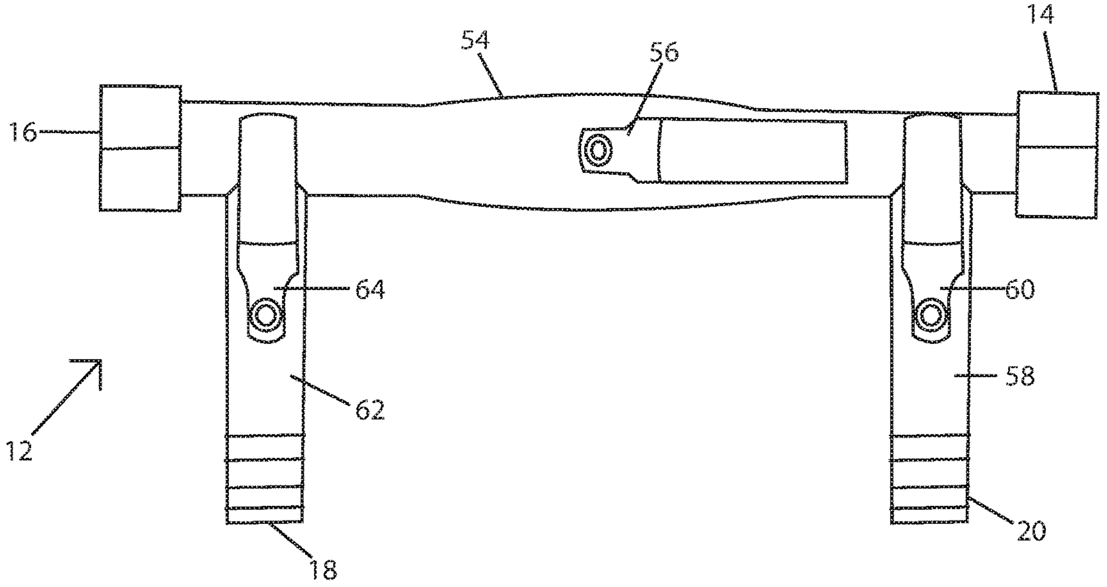
FIG. 2 is a top view of a fluid exchange fitting in accordance with an embodiment of the inventive concepts.

FIG. 2 shows one configuration of the fluid exchange fitting which would be installed in the coolant hose 32 of the first or the second vehicle. The fluid exchange fitting 12 shown in FIG. 2 includes a first conduit 54 which is a straight piece of pipe which has a first valve 56 in the approximate center of the first conduit 54. At one end of the first conduit 54 is a first inlet port 14 and at the other end is a first outlet port 16. Attached to the first conduit 54 is a second conduit 58, which has a second valve 60. Also attached to the first conduit 54 is a third conduit 62, with a third valve 64. When attached to a coolant hose 32, coolant would enter at the first inlet port 14 and if the second valve 60 and the third valve 64 were in a closed position and the first valve 56 was in an open position, then fluid would flow directly from first inlet port 14 to first outlet port 16 and circulate in a normal manner through the cooling system of the vehicle. The position described above is called the first position. The second position would be when the first valve 56 is closed, and the second and third valve 60 and 64 are open. When this occurred, if the second fluid exchange fitting 48 in a second vehicle is also in the second position and has transfer hoses attached, then the two systems would cause hot coolant from the second vehicle to flow into the cooling system of the cold first vehicle, and cold coolant from the first vehicle would flow into the warmed up and running second vehicle.

Figure 3:
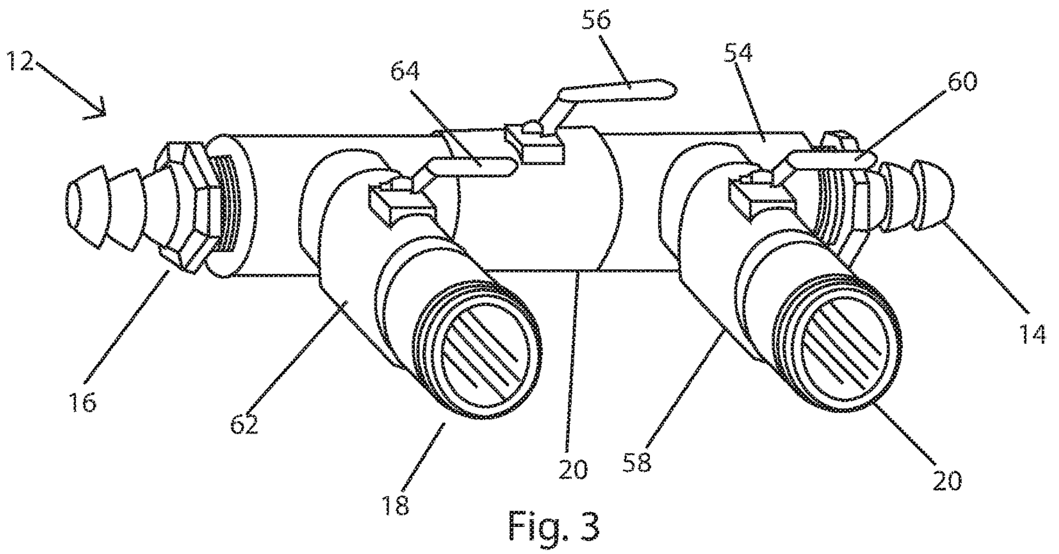
FIG. 3 is a perspective view of a fluid exchange fitting in accordance with an embodiment of the inventive concepts.

FIG. 3 shows a perspective view of the same version of the fluid exchange fitting as shown in FIG. 2.

Figure 4:
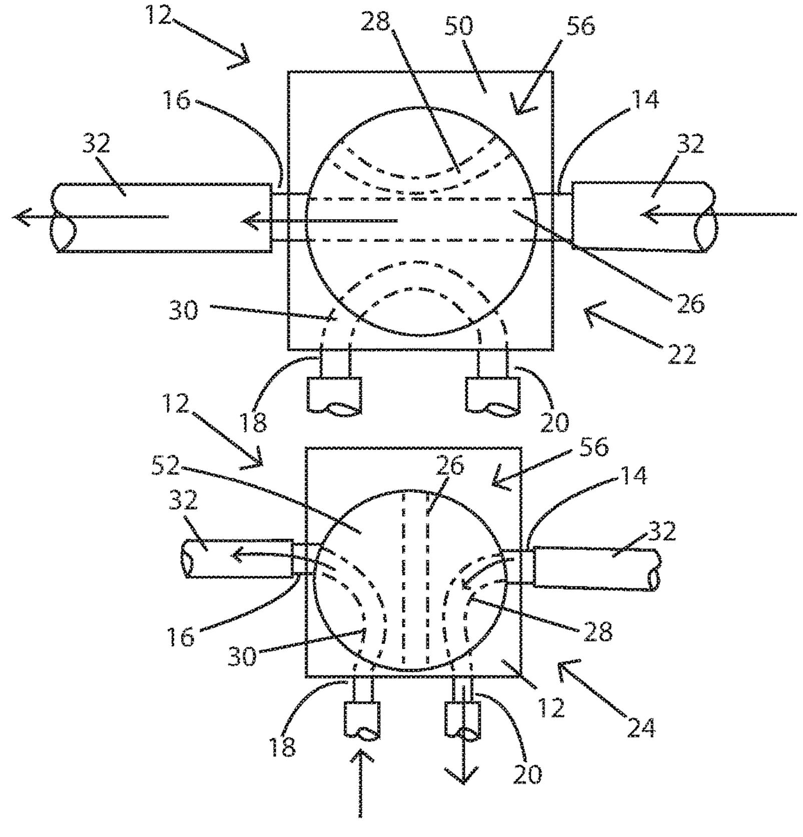
FIG. 4 is a cross-sectional view of fluid exchange fittings illustrating first and second positions of a valve setting on the fluid exchange fitting.

FIG. 4 shows an alternate embodiment of fluid exchange fitting 12, which is identical to the fluid exchange fitting 48 found in the second vehicle. Also shown in FIG. 4 is the fluid exchange fitting 12 in the first position 22 and a second position 24. In the embodiment shown in FIG. 4, the fluid exchange fitting has a fitting body 50 and a disc shaped hub 52. The fitting body 50 has the same inlet and outlet ports as shown in the previous figures, which includes a first inlet port 14, a first outlet port 16, a second inlet port 18 and a second outlet port 20. The disc shaped hub 52 includes a first passage 26, a second passage 28, and a third passage 30, which are hollow openings inside the disc shaped hub. When connected as shown in the upper view of FIG. 4, the fluid exchange fitting 12 is in the first position 22, and fluid from the coolant hose 32 goes directly through the first passage 26 and out the first outlet port 16 and back into the coolant hose 32, to continue circulating through the cooling system of the vehicle. In the lower view in FIG. 4, the disc shaped hub 52 is turned to the second position 24 and the second passage 28 aligns with the first inlet port 14 so that coolant passes through the fluid exchange fitting 12 and exits through the second outlet port 20. In this position, the third conduit 30 alligns with the second inlet port 18 and routes fluid through the third passage 30 to exit out the first outlet port 16, to reenter the coolant hose 32.

Figure 5:
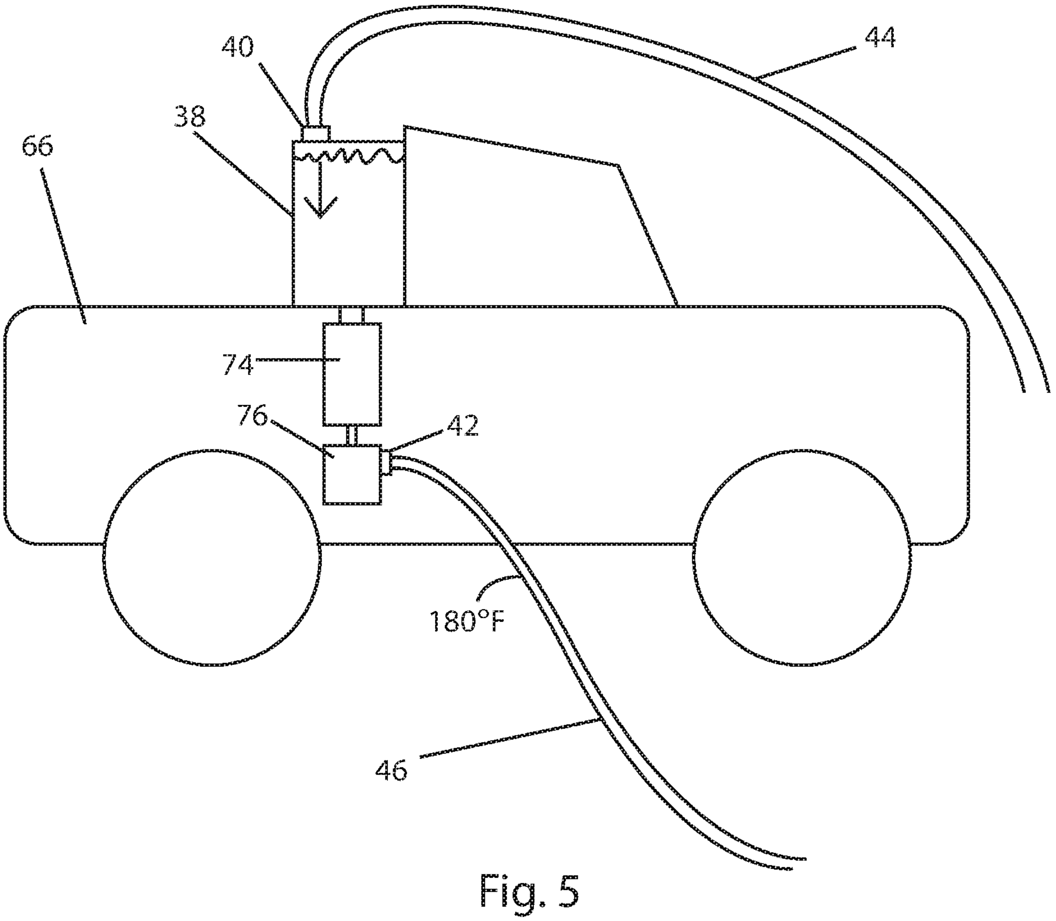
FIG. 5 is a side view fluid exchange tank and heater mounted in a second vehicle, in accordance with an embodiment of the inventive concepts.

FIG. 5 shows a configuration of the device in which the fluid to be warmed and exchanged is in a fluid exchange tank 38. It is connected to the first vehicle with a first fluid transfer hose 44 and a second fluid transfer hose 46 and further includes a heater 74 and a pump 76. The fluid exchange tank 38 could be on any vehicle, such as a pickup, a 4 wheeler, a snowmobile, or a non-motorized dolly or wagon. The fluid exchange tank includes a receiving port 40, and a discharge port 42, with the receiving port connected to $1^{st}$ transfer hose 44, and the discharge port 42 connected to $2^{nd}$ fluid transfer hose 46. This configuration is simply a different version of the system which uses a second vehicle as the fluid exchange tank, and illustrates a system which does not require use of a second fluid exchange fitting.

Figure 6:
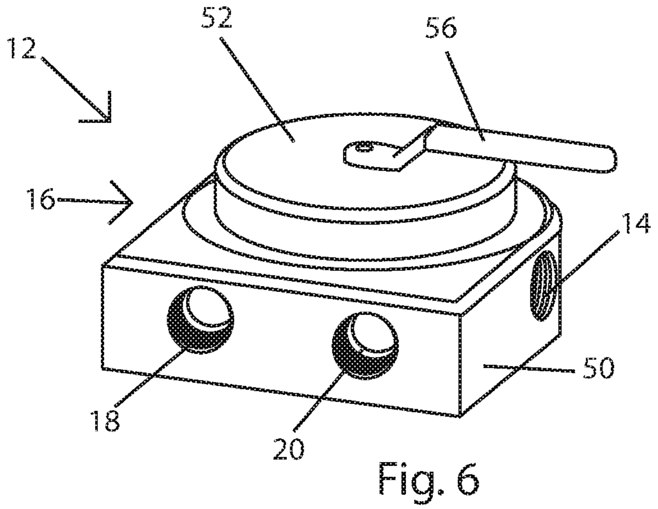
FIG. 6 is a perspective view fluid exchange fitting in accordance with an embodiment of the inventive concepts.

FIG. 6 shows a perspective view of the fluid exchange fitting 12 shown in FIG. 4, in which the fitting body 50 encloses a rotatable disc shaped hub 52, in which are found a first passage 26, second passage 28 and third passage 30. Shown in FIG. 6 is a first inlet port 14, a second outlet port 20, a second inlet port 18 and indicated, but not visible is a first outlet port 16. Shown is a first valve 56 which is used to turn the disc shaped hub to a first position or a second position.

Figure 7:
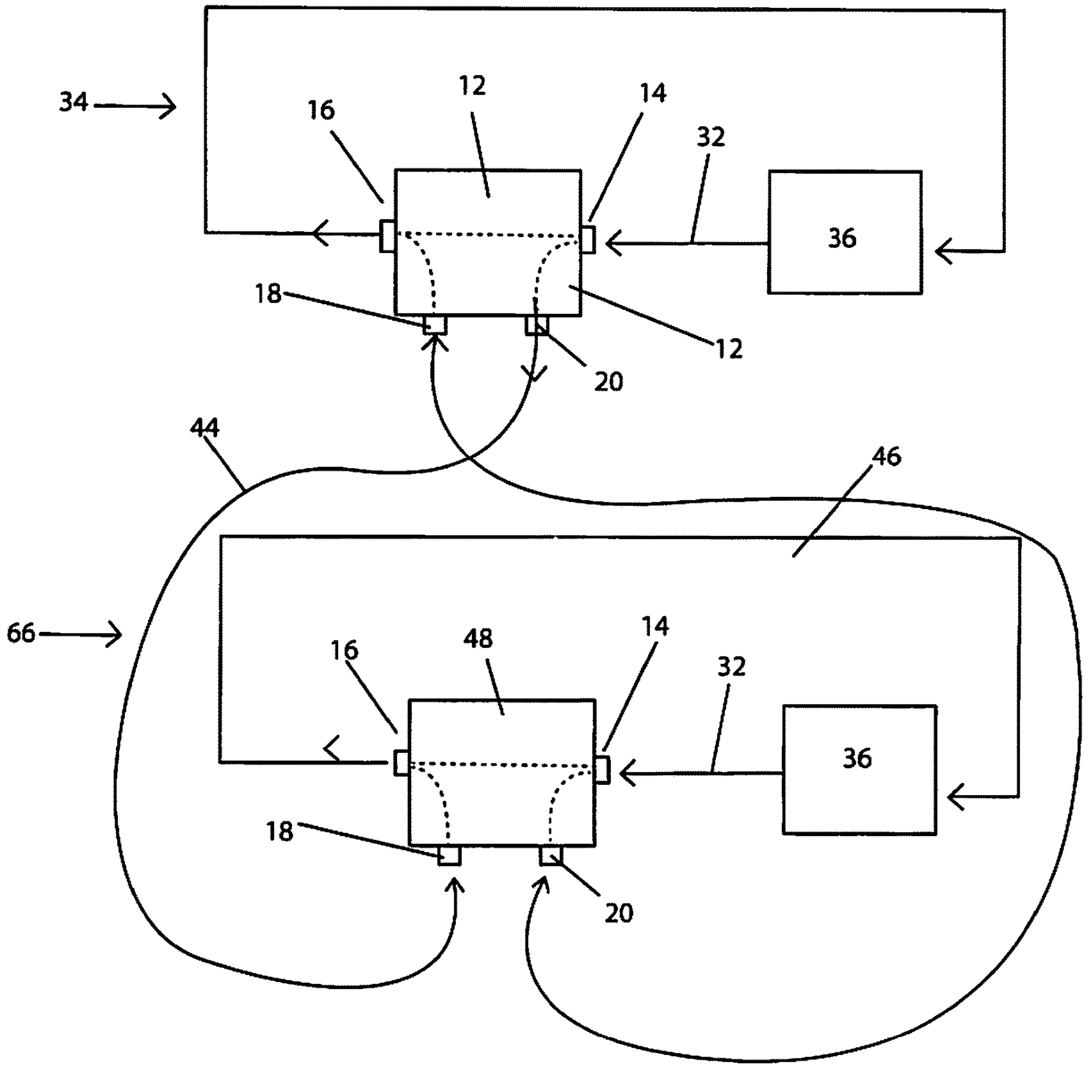
FIG. 7 is a schematic view of the connection between two vehicles each having a fluid exchange fitting.

FIG. 7 shows a more detailed version of how the fluid exchange fittings are connected to each other in two separate vehicles. FIG. 7 is a different view of the same set up in FIG. 1, but the fluid exchange fittings 12 and 48 are shown in greater detail. Both of these fittings could be set up with the fluid exchange fittings of FIG. 4 or the fluid exchange fittings of FIGS. 2 and 3.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. An engine warming system for water cooled vehicles with coolant hoses and a radiator, comprising:

a first fluid exchange fitting having a first inlet port, a first outlet port, a second inlet port, and a second outlet port;

said first fluid exchange fitting having a first position wherein a first passage is formed for the flow of a fluid between said first inlet port and said first outlet port;

said first fluid exchange fitting having a second position wherein a second passage is formed between said first inlet port and said second outlet port and a third passage is formed between said second inlet port and said first outlet port;

said first fluid exchange fitting selectively transitionable between said first position and said second position;

said first outlet port and said first inlet port connected to a coolant hose of a first vehicle so that, when said first fluid exchange fitting is in said first position, fluid within a cooling system of said first vehicle passes through said first fluid exchange fitting and is not diverted from said cooling system of said first vehicle;

a fluid exchange tank having a receiving port configured to receive a liquid from said first vehicle via said second outlet port, and a discharge port configured to discharge a fluid to said first vehicle via said second inlet port;

a heater connected to said fluid exchange tank for heating a quantity of fluid for exchange with said first vehicle fluid;

a first fluid transfer hose connectable between said exchange fitting second outlet port and said fluid exchange tank receiving port; and a second fluid transfer hose connected to said fluid exchange tank discharge port and said exchange fitting second inlet port;

said fluid exchange tank configured to heat a quantity of liquid for exchange with said fluid from said first vehicle, and to receive fluid from the second outlet port of said first vehicle, of returning said fluid to said first vehicle second inlet port when said first fluid exchange fitting is in said second position;

a second fluid exchange fitting for in-line attachment to a first hose in the a cooling system of a second vehicle, said second fitting having a first inlet port, a first outlet port, a second inlet port, and a second outlet port, said second fluid exchange fitting having a first position wherein a first passage is formed for the flow of a fluid between said first inlet port and said first outlet port of said second fitting;

said second fluid exchange fitting having a second position wherein a second passage is formed between said first inlet port and said second outlet port and a third passage is formed between second inlet port and said first outlet port of said second fitting;

said second fluid exchange fitting selectively transitionable between said first position and said second position;

said first inlet port of said second fitting and said first outlet port of said second fitting connected to a coolant hose of said second vehicle so that, when said second fluid exchange fitting is in said first position, fluid within said cooling system of said second vehicle passes through said second fluid exchange fitting and is not diverted from said cooling system of said second vehicle;

with said first fluid transfer hose connectable between said first exchange fitting second outlet port and said second exchange fitting second inlet port;

with said second fluid transfer hose connectable between said second fluid exchange fitting discharge port and said first exchange fitting second inlet port;

with said second fluid exchanging fitting capable of receiving fluid from the first fitting second outlet port, heating said fluid by routing it through the said second vehicle cooling system, and returning said fluid to said first fitting second inlet port when said first fluid exchange fitting and said second fluid exchange fitting are both in said second position.

2. The engine warming system of claim 1 in which one or both of said first fluid exchange fitting and said second fluid exchange fitting comprises a generally disk shaped rotatable hub mounted in a fitting body, said fitting body with a generally disk shaped recess for placing of the hub, with said body comprising a first fluid inlet port, a first fluid outlet port, a second inlet port for fluid entry, and a second outlet port;

with said hub being rotatable in said fitting body, and having a first passage, a second passage, and a third passage, with one position of hub in which said first passage of said hub aligns with said first inlet port and said first outlet port of said fitting body;

with said hub being rotatable in said fitting body to a position in which said hub second passage aligns with said fitting body first inlet port and second outlet port, and in the same position said hub third passage aligns with said fitting body second inlet port and said fitting body first outlet port.

3. The engine warming system of claim 1 wherein said fluid exchange tank further comprises a storage tank for receiving fluid from said first vehicle, a heater and a pump, with said storage tank, heater and pump configured to fit on a second vehicle.

4. The engine warming system of claim 1 in which said fluid exchange tank is a cooling system of a second vehicle, with said second vehicle equipped with a second fluid exchange fitting.

5. An engine warming system for water cooled vehicles with coolant hoses and a radiator, comprising:

a first fluid exchange fitting having a first inlet port, a first outlet port, a second inlet port, and a second outlet port, with said first inlet port connected to a first vehicle coolant hose for inflow of fluid into said fitting, and said first outlet port connected to said first vehicle coolant hose for outflow of fluid into said coolant hose, said coolant hose being part of a cooling system of said first vehicle;

said first fluid exchange fitting having a first position wherein a first passage is formed for the flow of a fluid between said first inlet port and said first outlet port;

said first fluid exchange fitting having a second position wherein a second passage is formed between said first inlet port and said second outlet port and a third passage is formed between said second inlet port and said first outlet port;

said first fluid exchange fitting selectively transitionable between said first position and said second position;

a second fluid exchange fitting for in-line attachment to a hose in a cooling system of a second vehicle, said second fitting having a first inlet port, a first outlet port, a second inlet port, and a second outlet port, with said first inlet port connected to a second vehicle coolant hose for inflow of fluid into said second fitting, and said first outlet port connected to said second vehicle coolant hose for outflow of fluid into said second vehicle coolant hose;

said second fluid exchange fitting having a first position wherein a first passage is formed for the flow of a fluid between said first inlet port and said first outlet port of said second fitting;

said second fluid exchange fitting having a second position wherein a second passage is formed between said first inlet port and said second outlet port and a third passage is formed between second inlet port and said first outlet port of said second fitting;

said second fluid exchange fitting selectively transitionable between said first position and said second position;

said first outlet port of said first fitting connectable by a first transfer hose to said second inlet port of said second fitting, and said second outlet port of said second fitting connectable to said second inlet port of said first fitting, so that when said first and second fluid exchange fittings are in said first position the fluid within each of said cooling systems is not diverted from each of said cooling systems, when said fittings are both in said second position, fluid from said first vehicle passes to said second vehicle, routes said fluid through the second vehicle cooling system, and returns said fluid to said first fitting second inlet port.

6. The engine warming system of claim 5 in which one or both of said first fluid exchange fitting or said second fluid exchange fitting comprises a generally disk shaped rotatable hub mounted in a fitting body, said fitting body with a generally disk shaped recess for placing of the hub, with the body comprising a first fluid inlet port, a first fluid outlet port, a second inlet port for fluid entry, and a second outlet port;

with said hub being rotatable in said fitting body, and having a first passage, a second passage, and a third passage, with one position of hub in which said first passage of said hub aligns with said first inlet port and said first outlet port of said fitting body;

with said hub being rotatable in said fitting body to a position in which said hub second passage aligns with said fitting body first inlet port and second outlet port, and in the same position said hub third passage aligns with said fitting body second inlet port and said fitting body first outlet port.

* * * * *